Feb. 15, 1955   B. BARÉNYI   2,702,206
MOTOR VEHICLE BODY SUPPORTED BY CROSS-BEARER
Filed Jan. 6, 1950
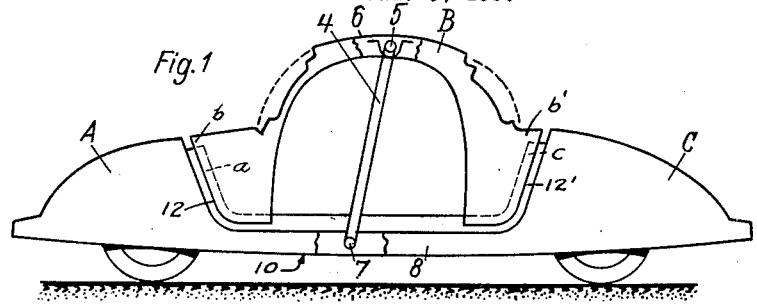
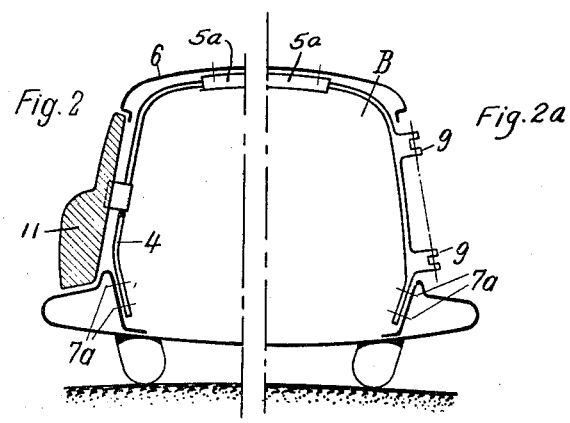
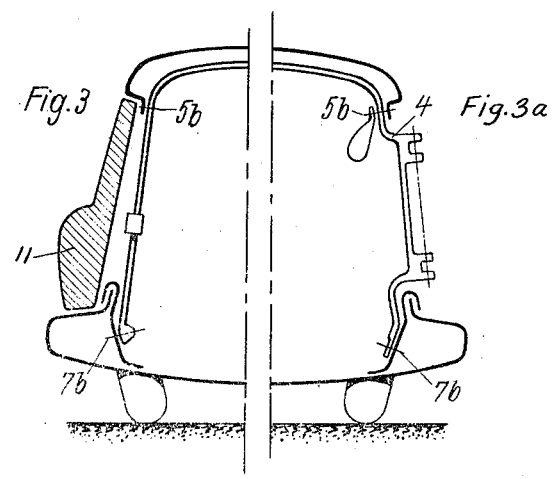
INVENTOR
BÉLA BARÉNYI
By: Haseltine, Lake & Co.
AGENTS

2,702,206

MOTOR VEHICLE BODY SUPPORTED BY CROSS-BEARER

Béla Barényi, Stuttgart-Rohr, Germany

Application January 6, 1950, Serial No. 137,058

Claims priority, application Germany January 8, 1949

5 Claims. (Cl. 296—28)

The present invention relates to a vehicle, especially to motor vehicles provided with an upper vehicle section, such as, for example, the body or a part of the body, which is supported against a lower or base vehicle section, such as, for example, a frame or chassis of the vehicle. More particularly, the present invention relates to a passenger motor vehicle having a rigid roof, i. e., of the hard-top type, as contrasted with convertibles, in which an upper section of the body which includes the roof part of the vehicle is supported against a lower or base section of the vehicle in a particularly favorable and simple manner.

It is, accordingly, a particular object of the present invention to provide great rigidity and high stiffness of the vehicle construction or of the body construction, accompanied simultaneously with a very low weight as well as simple construction and facilitated assembly.

It is another object of the present invention to provide a vehicle construction in which the section of the body containing the roof is supported against a lower section in a particularly advantageous and simple manner by means of a single, inverted U-shaped cross-bearer.

A characteristic feature of the present invention accordingly consists in that the upper portion of the vehicle, i. e., usually the vehicle body or a portion thereof, particularly the portion thereof enclosing the passenger space or compartment, is supported by means of a cross-bearer, which is fastened to the vehicle upper portion, on the one hand, and to the vehicle lower or base portion, on the other. The cross-bearer is U-shaped and open towards the bottom of the vehicle. The fastening of the cross-bearer may thereby preferably be made readily detachable at either or both fastening points, possibly also articulately and/or elastically. The supporting structure of the vehicle or of the car body in accordance with the present invention may, therefore, be made considerably lighter, simpler, and cheaper than with the known usual types of construction.

A particular advantage further consists in that the present invention makes possible to practically completely suppress the appearance of unfavorable stresses, especially torsional stresses.

Furthermore, the detachable fastening or securing of the cross-beam permits a simple installation or exchange thereof in case of damage without the necessity of detaching the entire body of the car, as is usual today.

The construction in accordance with the present invention is particularly favorable in connection with vehicles of the cellular type construction. The cross-bearer may be appropriately arranged in the vehicle in such a manner that it simultaneously constitutes the door posts and/or contains the hinges or the lock notches for the vehicle doors, and may also serve possibly for purposes of fastening highly loaded parts, as, for example, handles or hand rails for use of the passengers while traversing curves or the like.

The cross-bearer may follow the cross-profile of the vehicle body over its entire length or at least over a part thereof. In the latter case, it may be displaced outwardly of the body cross-profile, for example, in the region of the side walls in the direction out of the vehicle interior and into the door joint.

Further objects, features, and advantages of the present invention will become more obvious from the following description when taken in connection with the accompanying drawing which shows, for purposes of illustration only, several preferred embodiments of the present invention and wherein Figure 1 is a schematic side view, partly in section, of a vehicle in accordance with the present invention, Figure 2 is a schematic cross-sectional view of a specific embodiment of a vehicle showing only one half of the vehicle cross section having two symmetrical halves and taken transversely through the vehicle at a point slightly in front of the cross-bearer 4 and looking in the rearward direction of the vehicle, Figure 2a is a schematic cross-sectional view similar to Figure 2 of a slightly different embodiment in accordance with the present invention, Figure 3 is a schematic cross-sectional view, similar to Figure 2, of another embodiment in accordance with the present invention, and Figure 3a is a schematic cross-sectional view similar to Figure 3 of a still further embodiment in accordance with the present invention.

Referring now more particularly to the drawing, wherein like reference numerals are used throughout the various views thereof to designate like parts, reference character A designates the front section or cell of the vehicle, reference character C the rear section or cell of the vehicle, and reference character B the center section or cell of the vehicle. The cross-bearer 4, which is of the inverted U-shape, has two depending leg portions and a curved, bow-shaped connecting portion, and is arranged approximately in the middle of section B.

The front section A and the rear section C are connected to each other by means of a lower or base portion 10 of the vehicle, which may be constituted, for example, by the chassis or frame of the vehicle.

The center section or upper vehicle portion B includes arched body wall portions b and b' along both ends thereof with the side edges 12 and 12' inclined downwardly towards each other, as shown in Figure 1.

Similarly, the end sections A and C are provided with connecting body wall portions a and c, indicated in dashed lines in Figure 1, with the side edges thereof inclined downwardly towards each other and corresponding to the arched body wall portions b and b' of center section or upper portion B. The arched body wall portions b and b' of center section B fit over and rest against the connecting body wall portions a and c of end sections A and C in a downwardly-directed, wedge-like manner so as to be substantially immovable relative thereto.

The center section or upper vehicle portion B encloses the passenger space or compartment and includes a rigid roof 6, i. e., a hard-top roof as contrasted with convertibles, thereby providing a sedan-type passenger motor vehicle.

The cross-bearer 4 is fastened to the roof 6 as generally indicated at 5 by means of the curved connecting part thereof and to the vehicle chassis or frame 8 as generally indicated at 7 by means of the depending leg portions thereof, as shown in Figure 1. Both points of connections 5 and 7 at which the cross-bearer 4 is fastened to the roof 6 and to the chassis or frame 8 or only one of these points may be constructed detachably in any well-known manner so as to be readily detachable.

In the cross-sectional views of Figures 2 and 3, the doors 11 are shown in cross section, while in Figures 2a and 3a these doors are omitted in the right halves of these figures so as to indicate more clearly the arrangements of the depending leg portions of the inverted U-shaped cross-bearer.

Furthermore, the depending leg portions of the inverted U-shaped cross-bearer 4 of Figures 2 and 3 are illustrated slightly different from the depending leg portions of Figures 2a and 3a so as to illustrate various modifications thereof. It is understood, however, that both depending leg portions of the same vehicle are constructed identically.

In the embodiment according to Figure 2, the cross-bearer 4 is connected along its curved connecting part to the roof 6 at 5a by means of a link or articulate joint, while the fastening points 7a are formed rigidly. The cross-bearer 4 is constructed essentially in conformity with the cross-profile of the vehicle body 6. Thus, the cross-bearer 4 lies practically completely in the interior of the body 6.

In Figure 2a, hinges 9 and/or lock notches for the vehicle doors (not shown) are indicated schematically along the vertical or leg portions of the cross-bearer 4, that is, in the region of the side walls of the vehicle body 6.

In the embodiment according to Figure 3, the points of connections 5b and 7b of the cross-bearer 4 with the roof 6 and with the vehicle chassis or frame 8 are formed articulately, as, for example, by means of link joints. The link joint 7b may possibly be made elastically by means of an intermediate layer of rubber.

In Figure 3a the cross-bearer 4 is displaced into the door joint.

Furthermore, the cross-bearer may also extend wholly or partially on the outside of the vehicle body or in the surface thereof.

The particular manner in which the cross-bearer 4 proceeds may also be taken into account by imparting a corresponding contour to the vehicle at points of displacement thereof from the vehicle body, for example, by the formation of a groove or the like.

What I claim is:

1. In a sedan passenger motor vehicle, a vehicle base portion and a vehicle upper portion enclosing the passenger space and including a rigid roof, said upper portion having arched body wall portions along the ends thereof with the edges thereof inclined downwardly towards each other, said base portion having complementary connecting body wall portions with the edges thereof inclined downwardly towards each other and corresponding to said first-mentioned body wall portions, said first-mentioned body wall portions resting substantially immovably against said connecting wall portions in the form of a downwardly directed wedge, a single inverted U-shaped cross-bearer, and means connecting the depending leg portions of said inverted U-shaped cross-bearer to said base portion along the lower extremities thereof and connecting the curved connecting part of said cross-bearer to said roof to thereby support said upper portion on said base portion.

2. A sedan passenger vehicle according to claim 1, wherein at least one of said means provides limited movement of said cross-bearer relative to one of said base portions and said roof.

3. A sedan passenger vehicle according to claim 1, wherein said upper portion is provided with doorways therein, and wherein said depending leg portions of said cross-bearer constitute doorposts including means for suspending the doors therefrom.

4. A sedan passenger vehicle with a vehicle base portion, a front section, a center section, and a rear section, said sections being mounted on said base portion, said center section enclosing the passenger space and including a rigid roof, said center section having arched body wall portions along the ends thereof with the edges thereof inclined downwardly towards each other, said front and rear sections having complementary connecting body wall portions with the edges thereof inclined downwardly towards each other and corresponding to said arched body wall portions, said first-mentioned body wall portions resting substantially immovably against said connecting wall portions in the form of a downwardly directed wedge, said center section comprising an inverted U-shaped cross-bearer located substantially centrally thereof, and means connecting the depending leg portions of said inverted U-shaped cross-bearer to said base portion along the lower extremities thereof and connecting the curved connecting part of said cross-bearer to said roof to thereby support said center section on said base portion.

5. A sedan passenger vehicle according to claim 4, wherein at least one of said means provides limited movement of said cross-bearer relative to one of said base portions and said roof.

References Cited in the file of this patent

UNITED STATES PATENTS

| | | |
|---|---|---|
| 723,749 | Sprague | Mar. 24, 1903 |
| 1,438,195 | Thomas | Dec. 12, 1922 |
| 1,650,203 | Froesch | Nov. 22, 1927 |
| 2,070,758 | Spatz | Feb. 16, 1937 |

FOREIGN PATENTS

| | | |
|---|---|---|
| 486,068 | Great Britain | June 14, 1938 |
| 590,542 | France | June 18, 1925 |